United States Patent
Haley

(10) Patent No.: US 10,100,930 B2
(45) Date of Patent: Oct. 16, 2018

(54) SLEEVE SEAL FOR ELECTRIC FURNACE ELECTRODES

(71) Applicant: HATCH LTD., Mississauga (CA)

(72) Inventor: Stephen D. Haley, Mississauga (CA)

(73) Assignee: HATCH LTD., Mississauga (CA)

( * ) Notice: Subject to any disclaimer, the term of this patent is extended or adjusted under 35 U.S.C. 154(b) by 0 days.

(21) Appl. No.: 15/307,478

(22) PCT Filed: Apr. 27, 2015

(86) PCT No.: PCT/CA2015/050345
§ 371 (c)(1),
(2) Date: Oct. 28, 2016

(87) PCT Pub. No.: WO2015/164959
PCT Pub. Date: Nov. 5, 2015

(65) Prior Publication Data
US 2017/0051831 A1 Feb. 23, 2017

Related U.S. Application Data

(60) Provisional application No. 61/985,026, filed on Apr. 28, 2014.

(51) Int. Cl.
*F16J 3/00* (2006.01)
*F16J 15/08* (2006.01)
(Continued)

(52) U.S. Cl.
CPC ......... *F16J 15/0812* (2013.01); *F16J 15/028* (2013.01); *F16J 15/065* (2013.01);
(Continued)

(58) Field of Classification Search
CPC ...... F16J 15/0812; F16J 15/028; F16J 15/065; F16J 15/104; F24D 11/10; F27D 11/10;
(Continued)

(56) References Cited

U.S. PATENT DOCUMENTS 2,243,096 A 5/1941 Hardin
2,893,682 A * 7/1959 Hintzman ............. F16K 1/2285
137/493

(Continued)

FOREIGN PATENT DOCUMENTS

CN 1142309 A 2/1997
CN 1926923 A 3/2007
(Continued)

OTHER PUBLICATIONS

Shan-Rod Valves; Butterfly Valve with Battery Backup Actuator; Mar. 20, 2017; https://www.youtube.com/watch?v=8EBENeoczeQ.
(Continued)

*Primary Examiner* — Nathan Cumar
(74) *Attorney, Agent, or Firm* — DeLio, Peterson & Curcio, LLC; Thomas E. Ciesco

(57) ABSTRACT

A highly flexible sealing arrangement designed to seal high-temperature furnace ports, particularly the electrode port of an electric furnace. The seal comprises an annular support member fixed to a flexible sealing member and employs the use of a garter spring to uniformly apply the desired amount of seal compression. The arrangement and flexibility of the sealing member allows the seal to adapt itself to the wide range of operating and upset conditions that typically exist for a furnace electrode seal. Frictional wear on the seal may be greatly reduced as the design inherently allows for a much lower amount of seal compression to be applied, furthermore, the seal is able to move axially which can significantly reduce wear caused by electrode regulation.

23 Claims, 7 Drawing Sheets

(51) Int. Cl.
*F27D 11/10* (2006.01)
*F16J 15/02* (2006.01)
*F16J 15/06* (2006.01)
*F16J 15/10* (2006.01)
*H05B 7/12* (2006.01)

(52) U.S. Cl.
CPC ............ *F16J 15/104* (2013.01); *F27D 11/10* (2013.01); *H05B 7/12* (2013.01)

(58) Field of Classification Search
CPC .. F27D 11/00; F27D 99/0073; F27D 99/0075; F27D 99/0076; H05B 7/12; H05B 6/76; H05B 6/763; H05B 33/04
USPC .......................................................... 277/634
See application file for complete search history.

(56) References Cited

U.S. PATENT DOCUMENTS

| | | | |
|---|---|---|---|
| 2,954,884 A * | 10/1960 | Wilkening | C21B 7/18 414/202 |
| 3,124,502 A * | 3/1964 | Radke | F16J 15/20 277/536 |
| 3,379,816 A | 4/1968 | Hozven | |
| 3,601,416 A | 8/1971 | Coran | |
| 3,683,095 A | 8/1972 | Salmin et al. | |
| 3,697,660 A | 10/1972 | Frolov et al. | |
| 3,698,727 A | 10/1972 | Greenwald | |
| 3,709,506 A * | 1/1973 | Beerman | F16J 15/00 277/579 |
| 3,835,233 A | 9/1974 | Prenn | |
| 4,295,001 A | 10/1981 | Britton | |
| 4,306,726 A | 12/1981 | Lefebvre | |
| 4,377,289 A | 3/1983 | Lefebvre | |
| 4,441,726 A * | 4/1984 | Uhl | F16J 15/0812 277/637 |
| 4,468,043 A | 8/1984 | Brazel | |
| 4,759,032 A | 7/1988 | Willis | |
| 4,822,060 A | 4/1989 | Moyer et al. | |
| 5,406,580 A * | 4/1995 | McCaffrey | H05B 7/12 373/94 |
| 6,293,553 B1 | 9/2001 | Werner et al. | |
| 6,505,421 B1 * | 1/2003 | Vaz | A43B 3/0026 36/25 R |
| 6,644,007 B2 | 11/2003 | Fujiwara et al. | |
| 2011/0079965 A1 | 4/2011 | Dromain et al. | |
| 2015/0337966 A1 | 11/2015 | Shoji et al. | |
| 2016/0369436 A1 * | 12/2016 | Stewart | F16J 15/027 |

FOREIGN PATENT DOCUMENTS

| | | |
|---|---|---|
| CN | 203501803 U | 3/2014 |
| EP | 0443201 A1 | 8/1991 |
| JP | 5255168 B1 | 8/2013 |
| SU | 59706 A1 | 11/1940 |
| WO | 9119127 A2 | 12/1991 |
| WO | WO2005071335 | 8/2005 |

OTHER PUBLICATIONS

Shan-Rod Valves; 2600 Diverter Tee Valve (23957); Mar. 20, 2017; https://www.youtube.com/watch?v=6HECY6fjFBk.

* cited by examiner

SLEEVE SEAL FOR ELECTRIC FURNACE ELECTRODES

CROSS-REFERENCE TO RELATED APPLICATION

This application claims priority to and the benefit of U.S. Provisional Patent Application No. 61/985,026 filed Apr. 28, 2014, the contents of which are incorporated herein by reference.

TECHNICAL FIELD

The present subject matter relates to electrode seals that are used to seal the electrode port of an electric furnace, and more particularly to an electrode seal having a flexible sealing arrangement which is able to follow the axial movement of the electrode while withstanding the harsh operating environment of the furnace.

BACKGROUND

Electric furnaces are commonly used in the metals industries for melting and smelting operations. A typical electric furnace provides a refractory-lined enclosure, capable of withstanding high temperatures in which feed material is melted by one or more cylindrical electrodes that pass axially through circular ports in the roof to maintain an appropriate depth for the melting operation. Once an electrode strikes an arc with the molten bath, it then moves axially up and down within a controlled range to regulate the furnace power input. Raising the electrode leads to higher resistance and therefore less power input and less heat generation, while lowering the electrode leads to less resistance and therefore more power input and more heat generation. During the melting operation the electrode typically moves up and down within a range of about 30 cm relative to the bath level, on the order of about 5000 times per day. The bath level may also move up and down within a range of about 50 cm.

As the electrode power melts the charge material in the furnace, the electrode tips are gradually consumed due to oxidation and erosion. Therefore, to maintain continuous furnace operation, the electrodes are steadily renewed, typically using one of two methods. One way involves "pre-baked electrodes" which are pre-manufactured solid carbon sections that can be threaded onto the preexisting column as needed. A second method involves the in situ formation of "Soderberg electrodes" using consumable steel casings which are routinely welded together as needed and filled with carbon paste, which melts and bakes within the furnace. The second method allows for much larger electrodes to be utilized, typically up to 2 meters in diameter where needed.

Significantly oversized ports are typically provided in the furnace roof to allow for the passage and movement of the electrode column in order to accommodate adequate equipment tolerances, combined axial and lateral movements, electrode vibration, irregularly shaped electrodes, as well as to accommodate buildup that commonly accretes to the exterior of the electrode column during operation. This large annular gap around the electrode typically results in the escape of heat, gases, and other furnace material.

A seal assembly is typically provided for each electrode to limit the costly escape of hot gases and furnace dust. As well, a seal provides a thermal and physical barrier between the furnace interior and exterior. Furnace gases frequently contain toxic metallic fumes, as well as $SO_2$ and CO which are extremely toxic, and potentially lethal. Furthermore, inadequate electrode seals can negatively impact furnace efficiency and can result in difficulties maintaining the furnace atmosphere as well as meeting environmental regulations. High temperature gases that are able to flow through the electrode port can also accelerate the wear of the electrode and electrode port, and can lead to dangerous and difficult working conditions.

Maintaining an adequate electrode seal has proved to be an extremely difficult task, and for various reasons. The continuous upward and downward axial movement of the electrode results in the electrode surface constantly scraping against typical electrode seals, posing serious wear challenges in maintaining the seal. The electrode seal is also directly exposed to gas within the furnace freeboard, typically at temperatures of up to about 1500° C., but potentially higher depending on the operation, as well as pressure variations, resulting in large temperature differentials and significant seal material limitations. It is also common for an electrode to move radially off-axis during normal operations, both in position and plumbness, due to high electromagnetic forces, thrusts from charge banks, and due to mechanical tolerances. Soderberg electrodes are particularly prone to shape irregularities due to over or under sized casings, as well as casing deformation often leading to non-circular electrodes. An additional complication arises due to the welding of casing sections. While attempts are made to grind the welded surfaces free of imperfections, it is common for rough welds to damage an electrode seal. Prebaked electrodes are generally more uniform, however, the joint between adjacent electrode sections is frequently off-center resulting in a step at the interface between the two adjoining sections. Material emanating from within the furnace commonly accretes to the exterior of the electrodes as they are inserted and withdrawn through the roof port during normal operation. Soderberg electrodes have an additional risk of carbon paste leaking from within the casing and hardening on the exterior prior to passing through the electrode seal. This and other material buildup often permanently damage an electrode seal as it is repeatedly passed through the seal.

PRIOR ART

Numerous designs for electrode seals exist in the prior art. However, none of the designs known to the inventor are able to deal with the above difficulties in a satisfactory manner.

Given the harsh conditions under which electrode seals must operate, it is not possible to utilize many conventional sealing arrangements, such as those which rely upon elastically deformable sealing elements comprised of elastomeric materials such as rubber or silicone. Such materials are generally limited to temperatures well below the temperatures that typically exist within the furnace environment. Furthermore, these typical sealing arrangements typically do not allow for the amount of deformity required to operate sustainably for this specific application.

Some known electrode seals are not designed to provide a gas tight seal, but rather seek to reduce the area of the gap (U.S. Pat. No. 4,295,001, U.S. Pat. No. 3,835,233 and U.S. Pat. No. 3,379,816) or provide a gaseous curtain to limit emissions (U.S. Pat. No. 3,697,660). Some other designs attempt to provide a gas-tight seal by packing a soft, heat-resistant material into the annular opening; however, this material is frequently pulled out of the annulus by axial movement of the electrode, thereby eliminating the seal.

More robust seal designs are often quite complex, and may include a radially compressed sealing element that is free to move laterally but is restrained in the axial direction. In such arrangements, large compression forces are often applied to the electrode in an attempt to deform the sealing element to the contour of the electrode surface. Such designs are intolerant to the presence of accreted material on the surface of the electrode, and therefore often incorporate scraper blades to remove any accreted material and prevent it from entering the seal (U.S. Pat. No. 4,759,032, U.S. Pat. No. 3,683,095, and U.S. Pat. No. 3,601,416). Also, due to the large compression forces, the repetitive axial motion, and irregular sealing surface of the electrode, these seals are subject to severe wear and may require frequent maintenance.

Some known electrode seals employ multiple telescoping sections to permit the primary sealing gland to move with the electrode, greatly reducing the wear caused by electrode regulation (U.S. Pat. No. 4,377,289 and U.S. Pat. No. 4,306,726). However, such designs are often very costly, difficult to inspect and maintain, and are unable to accommodate significant variations in electrode diameter.

There remains a need for an electrode seal which avoids the use of complex mechanisms that degrade quickly in a harsh furnace environment, and which is compact, effective, inexpensive, and also allows for rapid inspection and maintenance.

OBJECT OF THE DISCLOSED INVENTION

The objective of the present invention is to address the need for a device capable of maintaining a seal in a high temperature, dusty environment against a highly variable cylindrical surface while allowing gross imperfections on the surface, particularly material accreted to the surface, to pass through the seal, without compromising the seal's integrity while still being financially beneficial and maintainable within the existing environment.

Concurring objectives are to occupy a small area, avoid the use of complex mechanisms that degrade quickly in a harsh furnace environment, and allow for rapid inspection and maintenance.

SUMMARY OF THE DISCLOSURE

The following summary is intended to introduce the reader to the more detailed description that follows, and not to define or limit the claimed subject matter.

The present invention utilizes a highly flexible seal, provided by the collar of one or more folded woven sheets, that allows the seal to expand and contract in the radial direction, as well as move laterally and axially within the confinements of the sheet(s).

Previous electrode seals may wear quickly due to the large compression forces used to deform the sealing element to the contour of the electrode surface. The present invention focuses on the flexibility of the seal to allow much lower compressive forces to be applied while also allowing the seal to move axially, thereby potentially reducing wear caused by electrode regulation.

A garter spring within the collar of the sheet(s) provides the seal compression around the electrode with enough flexibility to allow for the passage of the gross imperfections and inconsistencies common to electrodes. The radial width of the collar is selected such that the axial displacement achievable may reduce or eliminate excessive frictional wear caused during normal electrode regulation. Other sealing mechanisms that utilize a garter spring as a means of applying compression are limited in range and typically require an elastically deformable sealing member; however, elastomeric materials are not suitable for this particular application due to the high temperatures. The seal of the present invention is made up of one or more fabric sheets woven into a particular arrangement so as to promote the flexibility of the seal both radially and axially once folded. The individual fibers making up each of the sheets are initially arranged to approximate a "doubly-ruled" surface, a surface in which two straight lines pass through each point on the surface. This arrangement allows the radial width of the seal to be altered without reliance on any elastic properties of the material forming the seal. This allows for a highly flexible, effectively gas-tight seal to be formed from substantially inelastic ceramic fibers capable of operating in temperatures typical of an electric furnace. Furthermore, the seal is openly visible allowing for rapid inspection, and is simply connected such that it can be quickly replaced while the electrode is still in place, both highly valued features for an electrode seal.

With this arrangement the main source of wear, caused by electrode regulation, may be reduced by orders of magnitude or in some cases even eliminated, as the seal can move axially and absorb much of the cyclical movement of the electrode. For large electrode movements, the ease with which the seal can deform allows for a minimal contact pressure to be applied which reduces the frictional forces, and the contact area, both which reduce the wear rate.

Previous inventions have often required the use of scraper blades to remove accreted material whereas the present invention is typically capable of deforming around this material. Misaligned or undersized electrodes may be another significant cause of seal failure as many previous inventions fundamentally rely on the surface of the electrode to maintain their physical arrangement. When the electrode surface becomes too far out of position, these previous seals may fail catastrophically, and components may be permanently lost into the furnace. The present invention is able to maintain its physical arrangement with the electrode completely removed, and can typically continue sealing once the electrode is replaced.

Due to the inherent simplicity, robustness, and cost effectiveness of the present invention, there are many applications for this seal assembly beyond furnace electrode seals. By substantially reducing the dependence on material elasticity, this design is able to provide a highly adaptable seal in a wide range of environments and therefore additional applications are extensive.

In one aspect, there is provided an electrode seal assembly for sealing an annular gap between an outer cylindrical surface of an electrode and an edge of a port in a roof of an electric furnace, wherein a lower end of the electrode extends through the port into the furnace, and the electrode is movable through said port along a vertical axis. The electrode seal assembly comprises: (a) an annular sealing member having a supporting edge and a movable edge, wherein the supporting edge is adapted to be secured to a fixed surface and the movable edge is free and is arranged to engage the outer cylindrical surface of the electrode, the sealing member being flexible and the movable edge being displaceable axially and radially; and (b) a spring member located proximate to the movable edge of the sealing member, the spring member biasing the movable edge of the sealing member away from the supporting edge.

In another aspect, there is provided a seal assembly for sealing an opening between a variable sealing surface and a fixed surface for use at temperatures not typically suitable for elastic materials. The seal assembly comprises: (a) a sealing member having a supporting edge arranged to be secured to the fixed surface and a movable edge arranged to engage the sealing surface, the sealing member being flexible and allowing displacement of the movable edge parallel to and perpendicular to the sealing surface; and (b) a spring member located proximate to the movable edge of the sealing member, the spring member biasing the movable edge of the sealing member away from the supporting edge.

In another aspect, there is provided an annular sealing member comprising a supporting edge arranged to be secured to a surface, and a movable edge arranged to engage an outer substantially cylindrical surface. The sealing member comprises at least one flexible sheet comprised of a woven arrangement of heat-resistant fibers, the at least one flexible sheet being foldable so as to form a toroidal sleeve.

BRIEF DESCRIPTION OF THE DRAWINGS

In order that the claimed subject matter may be more fully understood, reference will be made to the accompanying drawings, in which:

DETAILED DESCRIPTION OF EMBODIMENTS

In the following description, specific details are set out to provide examples of the claimed subject matter. However, the embodiments described below are not intended to define or limit the claimed subject matter. It will be apparent to those skilled in the art that many variations of the specific embodiments may be possible within the scope of the claimed subject matter.

The first embodiment described below relates to a seal for sealing an electrode port in the roof of an electric furnace, through which a vertically-oriented electrode extends. However, it will be appreciated that the seal described below may be adapted for use in other fields where a seal is required against a highly variable cylindrical surface, and where there is relative movement between the seal and the cylindrical surface. It will also be appreciated that the surface is not necessarily cylindrical, nor does it need to be vertical. Rather, the seal described below can be used for devices having various shapes and/or orientations.

Figure 1:
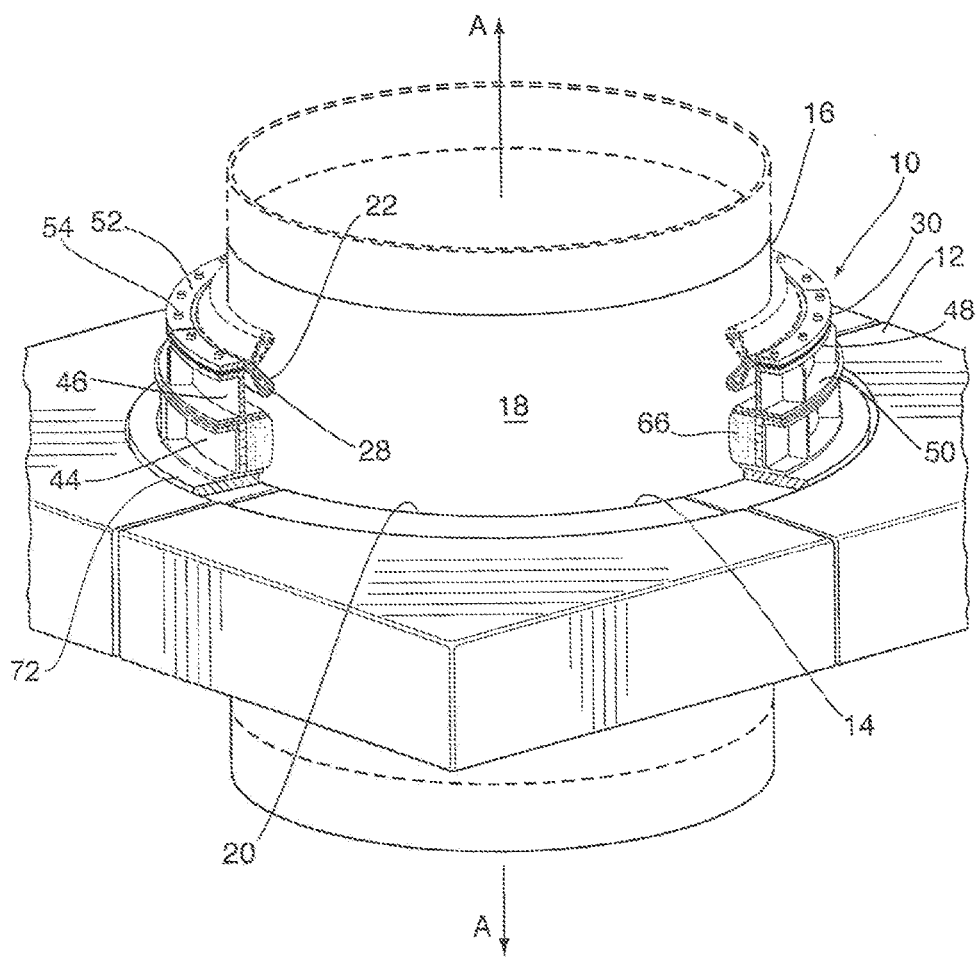
FIG. 1. is a pictorial view of a first embodiment of the seal assembly with a portion cut away around a typical Soderberg electrode. Visible lines are used to show the sealing member 22 displaced downwardly, hidden lines are used to show the sealing member 22 displaced upwardly.
Figure 2:
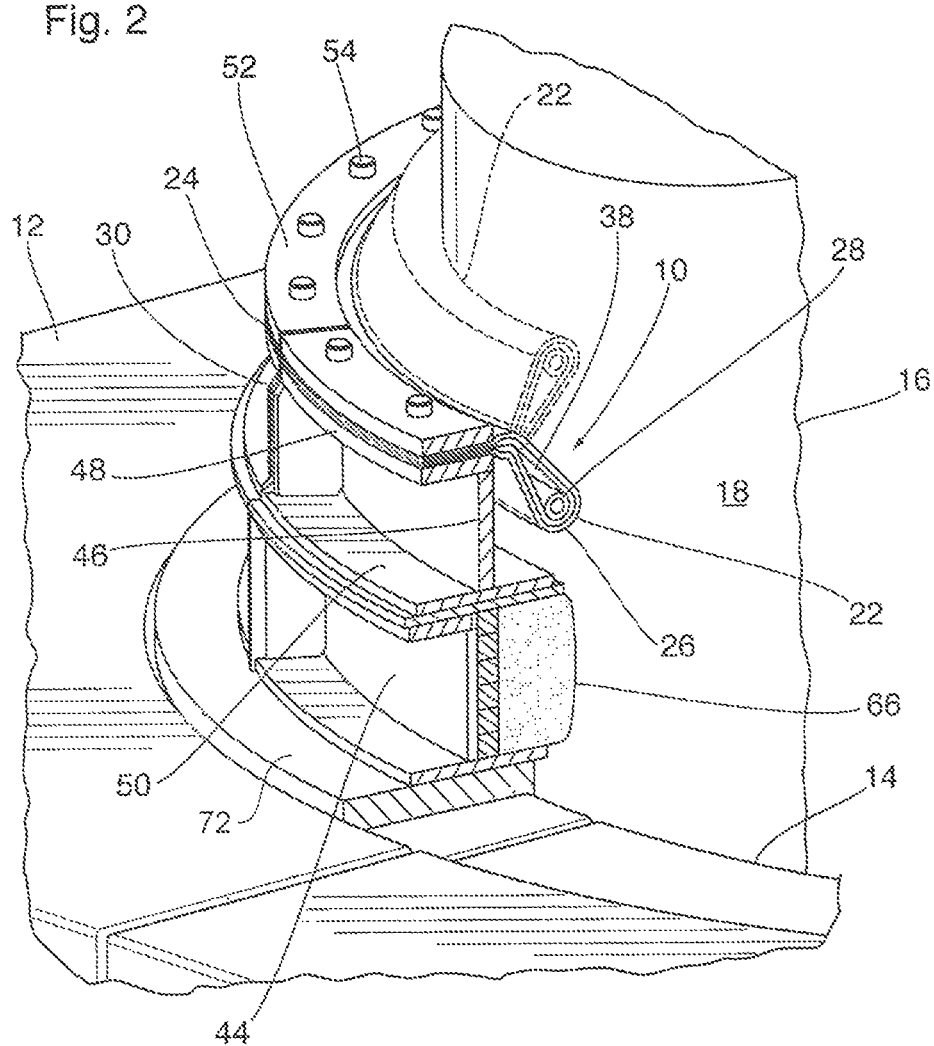
FIG. 2. is an enlarged portion of the seal assembly of FIG. 1.

FIG. 1 and FIG. 2 illustrate an electrode seal assembly 10 mounted on top of the roof 12 of an electric furnace for metal melting and/or smelting operations. The roof is constructed of a refractory material such as refractory brick, and has an electrode port 14 comprising a circular opening in the roof 12, through which the lower end of an electrode 16 extends into the interior of the furnace. Depending on the operation, the furnace freeboard (the gas space above the molten metal bath) will typically be at a temperature in the range of about 300° C.-1500° C., depending on the specific operation.

The electrode 16 is typically supported in a substantially vertical orientation by a conventional support structure (not shown), including means for raising and lowering the electrode within the furnace. As mentioned above, during operation of the furnace, the electrode 16 may be moved repeatedly up and down within a range of about 30 cm relative to the bath level, on the order of about 5000 times per day to regulate the furnace power input. The bath level may also move up and down, typically within a range of about 50 cm, which also requires electrode movement. During a furnace shut-down, the electrode 16 may be completely removed from the furnace while the electrode seal remains in place.

The electrode 16 has an outer surface 18 which is roughly cylindrical, and may include a number of defects as described herein. Where the electrode 16 is prebaked, the outer surface 18 will comprise carbon. Where the electrode 16 is a Soderberg electrode, the outer surface 18 will comprise metal since the Soderberg electrode has a sacrificial metal shell.

The port 14 has a diameter which is larger than the diameter of the outer surface 18 of the electrode 16, and therefore an annular gap 20 exists between the outer surface 18 of the electrode 16 and the edge of the port 14. The seal assembly 10 includes relatively few components. One of the components is a sealing member 22 for forming a seal across the opening between the sealing surface and the surrounding rigid surface. In the present embodiment the sealing surface is the outer surface 18 of the electrode 16. The rigid surface of the present embodiment comprises an annular seal housing 30 located on the roof 12 of the furnace, and fixed thereto. The seal housing 30 surrounds the electrode port 14 and is further described below.

The sealing member 22 has a supporting edge 24 arranged to be secured to the seal housing 30, and is sometimes referred to herein as the "secured edge 24". The sealing member also has a moveable edge 26 arranged to engage the sealing surface 18. In the present embodiment the sealing member 22 is annular and the secured edge 24 is located radially outwardly of the moveable edge 26.

Another component of the seal assembly 10 is a spring member 28 which biases the moveable edge 26 of the sealing member 22 in a radially inward direction and into sealed engagement with the sealing surface 18 of the electrode 16.

The sealing member 22 is flexible so as to permit the moveable edge 26 to be displaced in both the upward and downward directions, as well as displaced in the radial direction.

In order that the sealing member 22 will withstand the harsh environment of the electrode port 14, and survive continuous exposure to heat and gases rising from the furnace freeboard (i.e. the space within the furnace between the molten bath and the roof), the sealing member 22 comprises a material which is resistant to operating temperatures which exist in the furnace freeboard. For example, in the present embodiment, the material comprising the sealing member 22 is resistant to continuous exposure to freeboard temperatures up to about 1500° C.

In the present embodiment, the sealing member 22 is comprised of one or more sheets 32 of a fibrous ceramic fabric, the fabric being woven from substantially inelastic ceramic fibers.

The sealing member 22 has a folded structure, in which at least one sheet 32 has a pair of opposed edges 34, 36. The sheet 32 is folded over on itself such that the edge 34 is located above edge 36. The sheet 32 is folded with both edges 34, 36 located at or near the secured edge 24 of the sealing member 22.

The sealing member 22 is constructed from a plurality of sheets 32, each folded over on itself. Each sheet 32 of fabric may be somewhat permeable to gases, and therefore the number of sheets 32 is selected to provide a number of layers which will make the sealing member 22 substantially impermeable to furnace gases. The number of sheets 32 is also selected to provide wear resistance, particularly at the moveable edge 26, so as to allow for a certain amount of wear before the sealing member 22 needs to be replaced. For the purpose of illustration the sealing member 22 is shown as comprising two folded sheets 32, such that the sealing member 22 is made up of four fabric layers. However, the sealing member 22 may comprise one sheet 32 or more than two sheets, depending at least partly on permeability of the fabric and the desired wear characteristics.

The sealing member 22 may be described as having a toroidal shape, being in the form of a toroidal collar made up of folded fabric sheets 32. The minimum inner diameter of the annular sealing member 22 (defined as the inner diameter of the sealing member 22 with the electrode withdrawn from the seal assembly 10) is smaller than the diameter of the electrode 16, so as to provide a seal between the sealing member 22 and the electrode 16, and as well, to allow for axial movement of the moveable edge 26.

Figure 4:
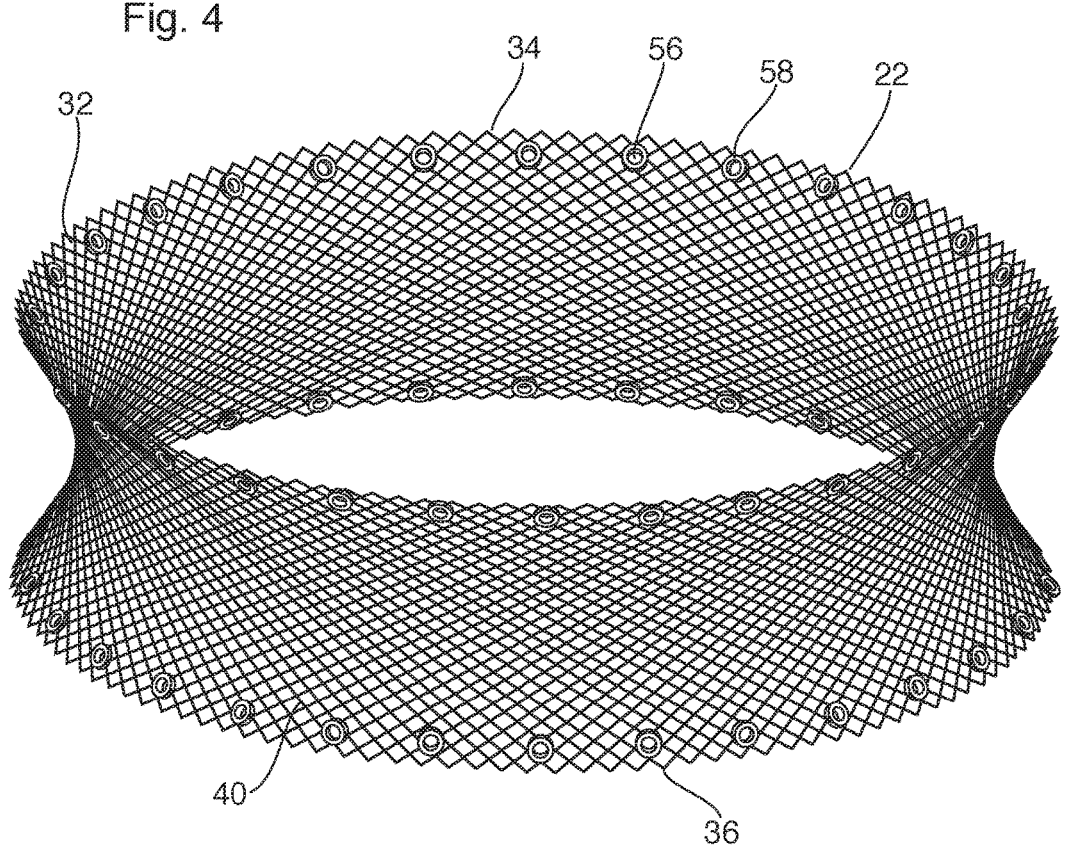
FIG. 4. is an explanatory view of the doubly-ruled surface that is used to construct the sheets 32 of the sealing member 22.
Figure 5:
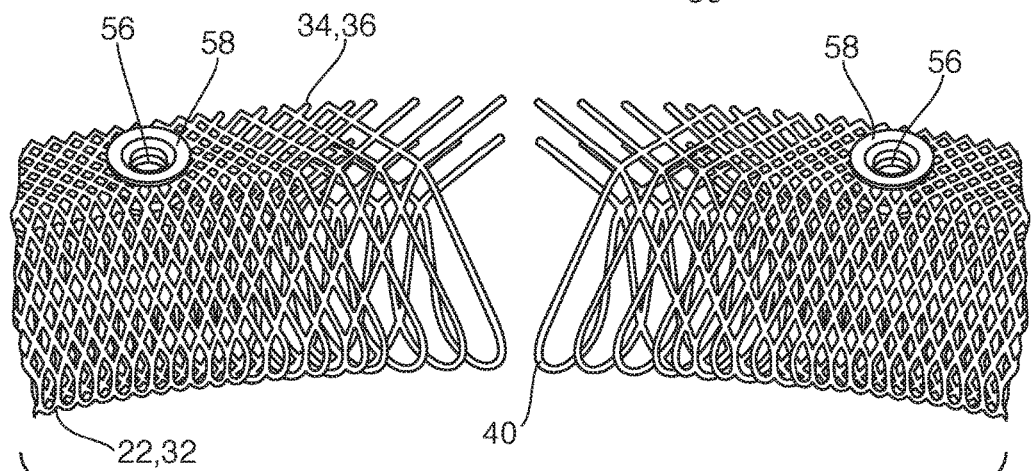
FIG. 5. is a pictorial view of one folded sheet 32 within the sealing member 22, with a number of the fibers removed revealing the arrangement of the individual fibers.

In the sealing member 22, the fibers making up the fabric sheets 32 are woven into a particular arrangement so as to promote the flexibility of the sealing member 22 both radially and axially. In this regard, the individual fibers making up each of the sheets 32 are initially arranged to approximate a "doubly-ruled" surface, a surface in which two straight lines pass through each point on the surface. With reference to FIG. 4, a single sheet 32 is shown as being unfolded along the vertical axis A, with many fibers removed but maintaining its annular shape. Once this "doubly-ruled" surface is folded as shown in FIG. 5, the angle of the fibers can be freely altered, allowing the radial width of the surface to change freely as well. It will be appreciated that each sheet 32 may only approximate this doubly-ruled surface.

This arrangement allows the radial width of the sealing member 22 to be altered without reliance on any elastic properties of the material comprising the sealing member 22.

The spring member 28 in the seal assembly 10 is enclosed within the hollow space 38 defined by the folded sheet structure of the sealing member 22. The spring member 28 is resistant to high operating temperatures and may be comprised of a heat resistant metal. In the present embodiment, the spring member 28 comprises an annular spring such as a garter spring. The spring member 28 constantly biases the moveable edge 26 in a radially inward direction. Therefore, the spring member 28 is under tension both when the seal assembly 10 is sealing the electrode 16, and when the electrode 16 is withdrawn from the seal assembly 10.

The tension of the spring member 28 is selected to provide the minimum amount of compression on the outer surface 18 of the electrode 16 that will provide a gas seal under normal operating conditions of the furnace. The high flexibility of the sealing member 22 allows the compression to be minimized while maintaining a seal between the sealing member 22 and the outer surface 18 of the electrode 16. These low compressive forces, coupled with the high flexibility of the sealing member, permit the shape of the sealing member 22 to continuously adapt to any of the electrode surface irregularities mentioned above, while minimizing the wear of the sealing member 22 caused by friction between the sealing member 22 and the irregular outer surface 18 of the electrode 16. Therefore, the seal assembly 10 does not require scrapers to remove surface accretions from the electrode. An added benefit of the present design is that it permits the seal assembly 10 to allow pressure relief, whereby furnace gases may escape between the sealing member 22 and the outer surface 18 of the electrode 16 in the event of a sudden extreme pressure change within the furnace. Such pressure relief is not provided by prior art seal designs which apply high compressive forces on the electrode. Thus, the present design also helps to prevent damage to the seal assembly 10 in the event of sudden pressure increases within the furnace.

Figure 3:
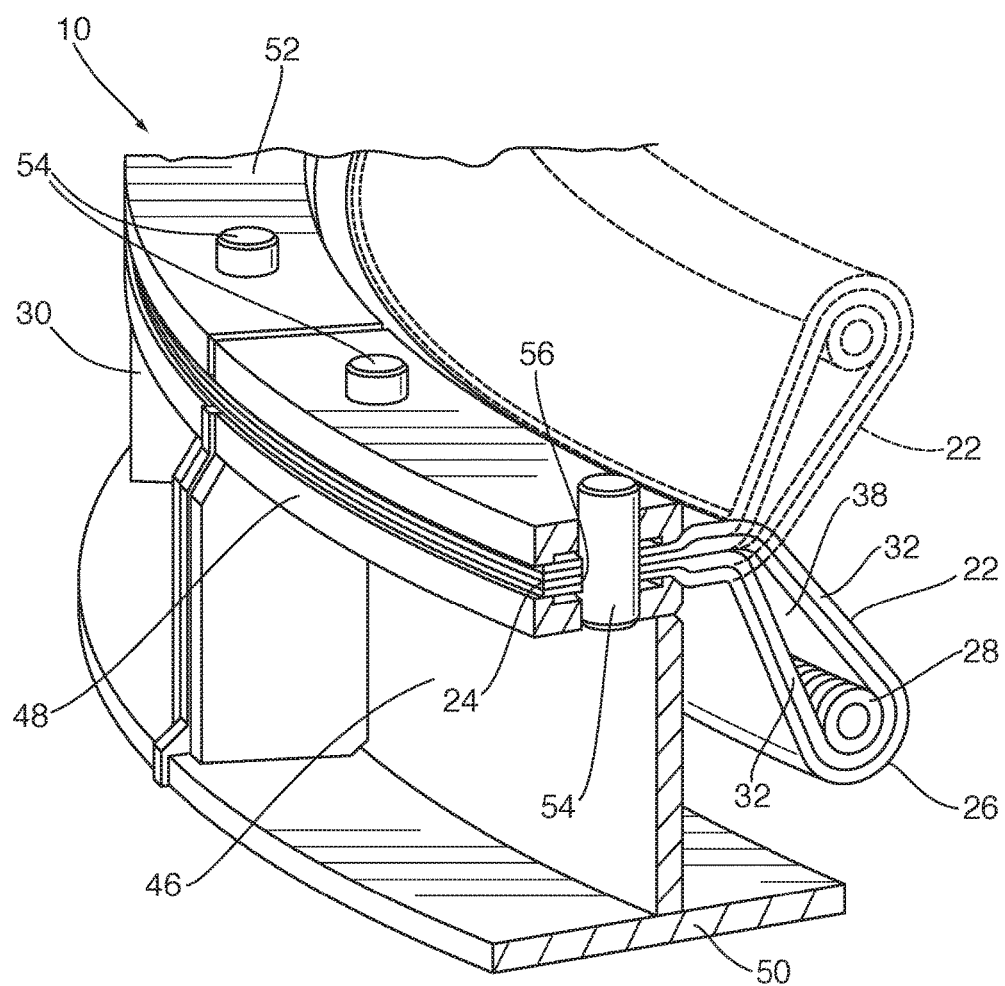
FIG. 3. is an enlarged portion of the seal housing assembly and sealing member.

In the first embodiment, the secured edge 24 of the sealing member 22 is secured to a rigid surface, such as the seal housing 30. This is best seen in FIGS. 2 and 3. The seal housing 30 is located on the furnace roof 12 and comprises an annular ring having an inner diameter greater than the diameter of the furnace port 14. The seal housing 30 shown in the drawings includes a continuous vertical side wall 46 having a horizontal top flange 48 and a horizontal bottom flange 50. The seal housing 30 may further comprise a retaining plate 52 in the form of a flat, annular ring of approximately the same size as the top flange 48, which is mechanically secured to the top flange 48 over a plurality of pins 54 spaced about the circumference of the top flange 48 which pass through holes in the retaining plate 52.

The secured edge 24 of the sealing member 22 is secured and compressed between the top flange 48 and the retaining plate 52 of the seal housing 30. The sealing member 22 contains a plurality of apertures 56 close to the secured edge 24, to permit pins 54 to pass through the sealing member 22. To provide added strength, the apertures 56 may be reinforced with metal grommets 58.

As shown in FIG. 2, the top of the seal housing 30 may be open, with the secured edge 24 of the sealing member 22 being located close to the open top of the seal housing 30. With this arrangement, the moveable edge 26 of the sealing member 22 can be axially displaced upwardly above the top of the seal housing 30 by a desired amount during upward axial displacement of the electrode 16. The sealing member 22 is shown in FIG. 2 using hidden lines in this upward arrangement. The seal housing 30 also permits the moveable edge 26 of the sealing member 22 to be axially displaced downwardly by a desired amount during downward axial displacement of the electrode 16. The sealing member 22 is shown in FIG. 2 using visible lines in this downward arrangement. The open top of the seal housing 30 also permits easy inspection and replacement of the sealing member 22.

A brick housing shield 44 may be provided between the seal housing 30 and the furnace roof 12 to partially shield the seal assembly 10 from the heat and gases from the furnace interior. The brick housing shield 44 comprises an annular ring that contains refractory bricks 66 that extend partly across the opening 20 between the electrode 16 and the edge of the electrode port 14.

A water-cooled copper cooler 72 may also be provided between the brick housing shield 44 and the furnace roof 12 to provide additional thermal shielding to the seal assembly 10.

Figure 8:
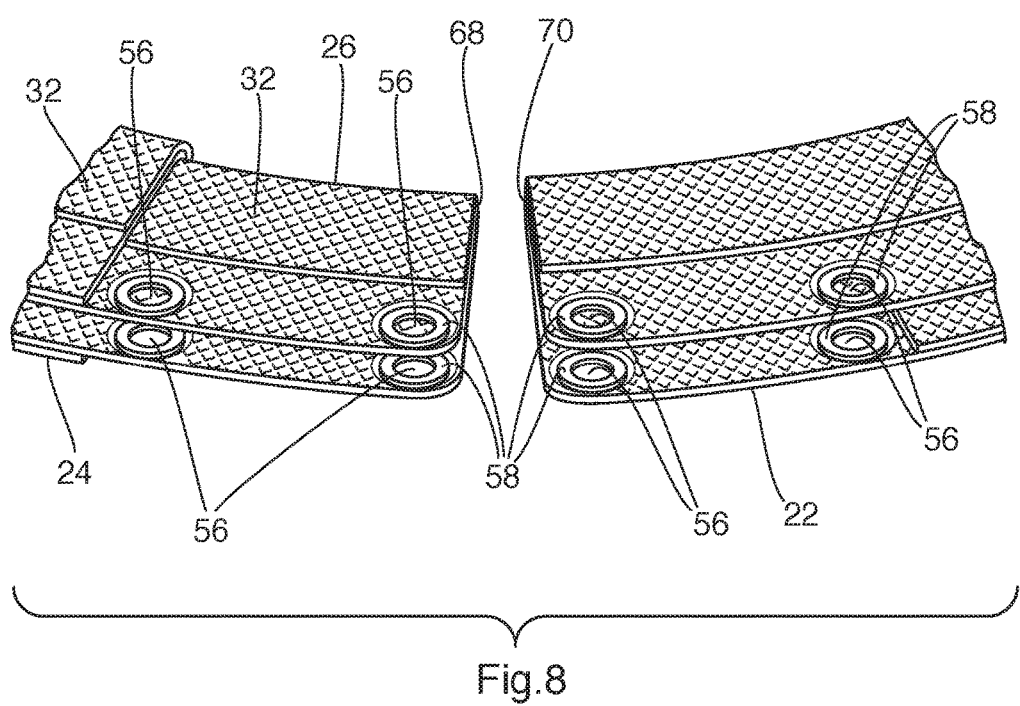
FIG. 8. is a pictorial view of the sealing member 22 in its open position, revealing the lapped joint which allows for installation and maintenance.

The sealing member 22 can be removed by first removing the retaining plate 52 from the top flange 48 to free the secured edge 24 of the sealing member 22. In some embodiments, the sealing member 22 is configured to permit it to be installed, removed and/or replaced with the electrode 16 in place, i.e. with the lower end of the electrode extending through the port 14 in the furnace roof 12. To permit such installation, both the sealing member 22 and the spring member 28 can be opened so that they can be wrapped around the electrode 16 and installed on the top flange 48 of the seal housing 30. Accordingly, as shown in FIG. 8, the sealing member 22 may be provided with a first end 68 and a second end 70 which can be joined to form the toroidal collar structure of sealing member 22. Because the annular structure of the sealing member must be continuous, the ends 68, 70 of the sealing member 22 must overlap, and the thickness of the overlapped portions should be substantially the same as the thickness of the remainder of the sealing member 22. This can be accomplished in a number of ways, depending on the specific structure of the sealing member 22. For example, as shown in FIG. 8, the sealing member 22 comprises two sheets 32 and a total of four layers, where one end 68 will have the outer sheet 32 cut back by an amount equal to the overlap, and the other end 70 will have the inner sheet 32 cut back by an equivalent amount. Accordingly, the first end 68 will fit within second end 70 of the sealing member 22, such that the overlapped portion will comprise the same number of layers at any point along its length. The overlap joint can be secured by providing at least one set of apertures 56 with grommets 58 through which the overlapping portions of the sealing member 22 are securely held together.

The spring member 28 may comprise a linear, elongated coil spring having fastening means at its opposite ends, to permit the ends to be connected together.

Having now described the components of the seal assembly 10, further features of the seal assembly 10 are described below in connection with the operation of the seal assembly.

Figure 6:
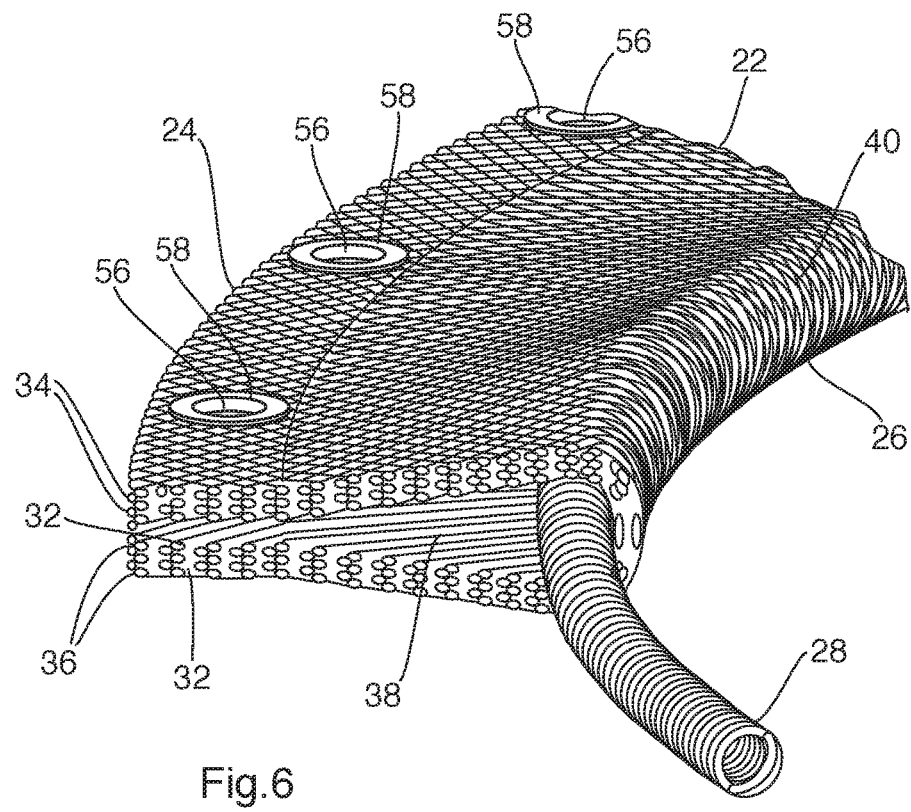
FIG. 6. is an enlarged cutaway view of a portion of the sealing member 22, showing the support grommets and garter spring, in its installation position with no sealing surface present.

As mentioned above, the minimum inner diameter of the sealing member 22 is less than the diameter of the outer surface 18 of the electrode 16. Accordingly, in a situation where the electrode 16 is withdrawn from the furnace port 14 and removed from the seal assembly 10, the sealing member 22 may have the horizontal configuration shown in FIG. 6, with the spring member 28 biasing the moveable edge 26 of the sealing member 22 in a radially inward direction. The seal assembly 10 as described herein is entirely self-supporting, and maintains its structure regardless of whether the electrode 16 is present or absent from the furnace port. If required, the electrode 16 can be lowered into the furnace port 14 or removed from furnace port 14 with the sealing member 22 in place. In some prior art designs, the structure of the seal is not maintained without the presence of the electrode 16, which complicates the insertion and removal of the electrode 16.

With the electrode 16 extending through the furnace port 14, the sealing member 22 will expand its inner diameter so that it can accommodate and form a seal with the outer surface 18 of the electrode 16. It is emphasized that this expansion of the sealing member 22 is accomplished without any stretching of the fibers 40 making up the sealing member 22, but rather is accomplished by the movement of the fibers 40 within each sheet 32 of the sealing member 22, and by the expansion or lengthening of the spring member 28.

As mentioned above, the electrode 16 is moved up and down by small amounts to control the furnace power input. When the electrode 16 is moved upwardly, the flexibility of the sealing member 22 permits the moveable edge 26 to move upwardly with the electrode 16. Similarly, when the electrode 16 is moved downwardly, the flexibility of the sealing member 22 permits the moveable edge 26 to move downwardly.

The radial width of the sealing member 22 is selected to permit enough upward and downward displacement of the moveable edge 26, so as to minimize or eliminate the repetitive frictional sliding of the moveable edge 26 along the rough outer surface 18 of the electrode 16 caused by electrode regulation. Thus, the axial movement of the moveable edge 26 permits the seal assembly 10 to absorb the cyclical movement of the electrode 16, thereby reducing the main source of wear on the sealing member 22. For larger movements of the electrode 16, the relatively low contact pressure applied to the electrode 16 reduces the contact area and frictional forces between the sealing member 22 and the electrode 16, both of which further reduce the wear rate.

Figure 9:
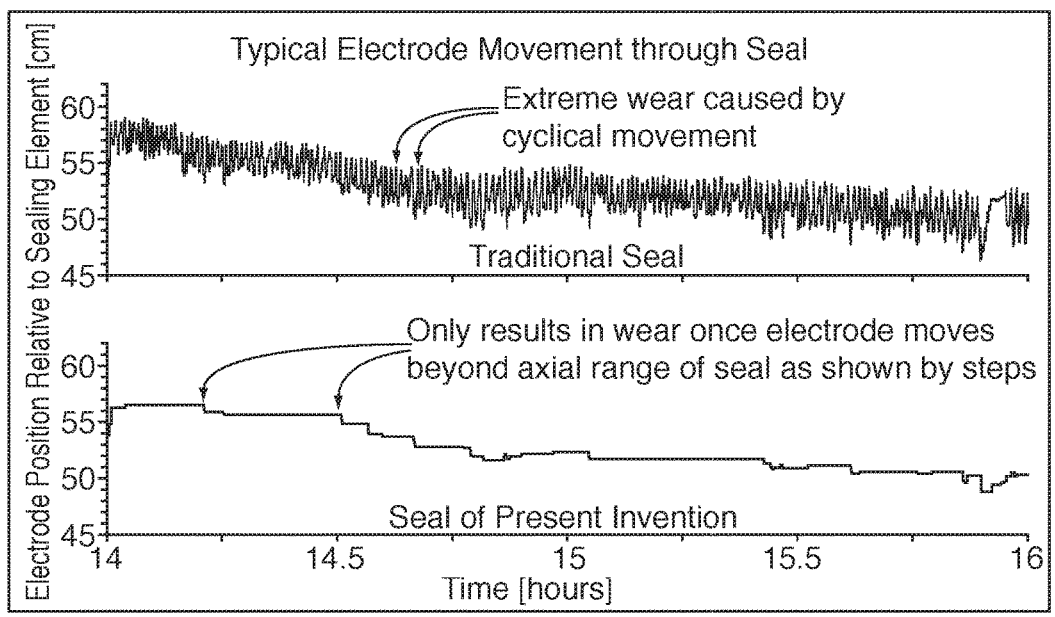
FIG. 9. is a graphical representation of electrode movement through a typical electrode seal, as well as the electrode movement through the electrode seal assembly of FIG. 1, whereby the allowable axial movement eliminates much of the cyclical wear.
Figure 10:
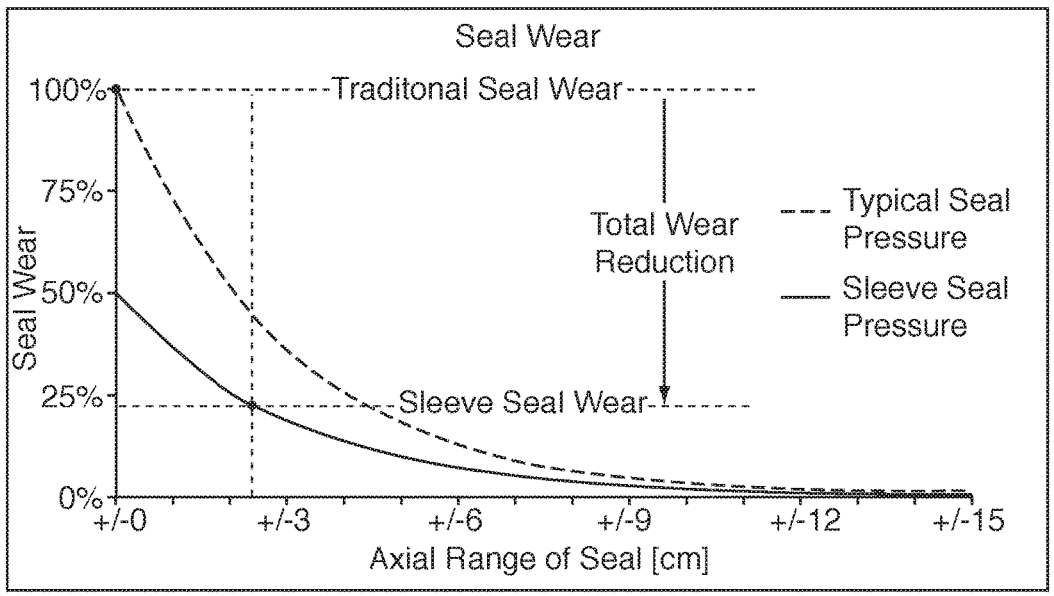
FIG. 10. is a graphical representation of how the axial range of seal movement and seal pressure relate to seal wear.

The axial movement of the moveable edge 26 has a significant impact on seal wear. As depicted in the upper graph of FIG. 9, a considerable portion of electrode movements occur cyclically within a short range. By allowing the seal to move axially, much of the wear is eliminated as the seal can follow the electrode throughout this repetitive movement. It is only once the electrode moves beyond the axial range of the seal that wear actually occurs. It is shown in FIG. 10 that even a small range of movement results in a significant reduction in wear, and a reduction in sealing pressure, made possible by the seal flexibility, further reduces the wear rate.

An optional feature which may be added to the sealing member 22 not shown in the figures is an additional outer sheet 32 included to further protect the sealing member 22 from abrasion. This outer sheet 32 may be comprised of metal fibers (or wires) oriented in a similar manner to the ceramic fibers 40. Alternatively, the outer sheet 32 may be comprised of metal mesh similar to chainmail. In certain orientations, chainmail possesses flexibility characteristics similar to that of the sheets 32 of sealing member 22 and therefore does not reduce the flexibility of the sealing member 22.

A seal assembly according to a second embodiment is briefly described below with reference to FIG. 7. Elements of the second embodiment that are similar to those of the first are referred to by the same reference numerals, however primed in the second embodiment.

Figure 7:
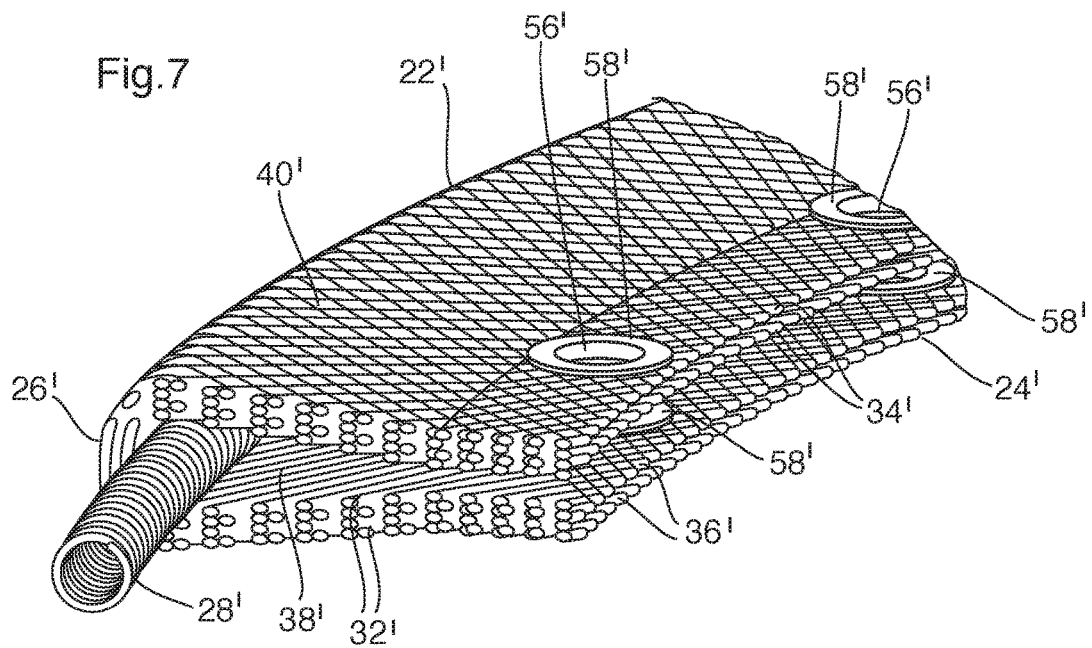
FIG. 7. is an enlarged cutaway view of a portion of the sealing member 22' according to a second embodiment, showing the support grommets and garter spring, in its installation position with no sealing surface present.

FIG. 7 shows the sealing member 22' of a seal assembly as defined herein, which also includes a spring member 28'. As in the first embodiment, the sealing member 22' is comprised of folded sheets 32' of a fabric comprised of fibers 40', the sheets 32' each having opposed edges 34' and 36' which are folded over one another to form a toroidal collar with a hollow interior 38' within which the spring member 28' is enclosed.

The sealing member 22' includes secured and moveable edges 24', 26', with the spring member 28' being proximate to the moveable edge 26'. However, the sealing member 22' of the second embodiment has the opposite orientation that of the first embodiment. In this regard, the secured edge 24' is located radially inwardly of the moveable edge 26', which is again displaceable along axis A. Thus, the moveable edge 26' of the sealing member 22' is designed to form a seal with an inner surface of a cylindrical object, such as an interior surface of a duct or pipe (not shown).

The moveable edge 26' is continuously biased in a radially outward direction by the spring member 28', which comprises an annular compression spring.

The sealing member 22' will be secured to a seal housing (not shown), which may be similar in structure to seal housing 30 described above, and may retain the secured edge 24' in the same or similar manner as described above with reference to seal assembly 10. However, rather than projecting radially inwardly from the seal housing 30, as in seal assembly 10, the sealing member 22' will project radially outwardly of the seal housing.

The present invention therefore provides an electrode seal assembly for sealing an annular gap between an outer cylindrical surface of an electrode and an edge of a port in a roof of an electric furnace, wherein a lower end of the electrode extends through the port into the furnace, and the electrode is movable through said port along a vertical axis, the electrode seal assembly comprising:
(a) an annular sealing member having a supporting edge and a movable edge, wherein the supporting edge is adapted to be secured to a fixed surface and the movable edge is free and is arranged to engage the outer cylindrical surface of the electrode, the sealing member being flexible and the movable edge being displaceable axially and radially; and
(b) a spring member located proximate to the movable edge of the sealing member, the spring member biasing the movable edge of the sealing member away from the supporting edge.

The following may be employed in the present invention:
The sealing member comprises a material which is resistant to temperatures up to about 1500° C.
The sealing member comprises substantially inelastic, heat-resistant fibers.
The sealing member comprises a ceramic material or a heat-resistant metal.
The spring member is annular.
The sealing member comprises at least one flexible folded sheet having a pair of opposed edges, wherein the opposed edges of the sheet are located proximate to the supporting edge of the sealing member.
The spring member is enclosed within the at least one flexible folded sheet.
The sealing member comprises a plurality of said flexible folded sheets, arranged in a plurality of layers.
The sealing member comprises a toroidal sleeve enclosing the spring member.
The toroidal sleeve has a pear-shaped radial cross-section, with the moveable edge of the sealing member having a rounded profile.
The toroidal sleeve comprises a woven arrangement of fibers.
The woven arrangement of fibers approximates a doubly-ruled surface.
The supporting edge secured to the fixed surface, the movable edge is free to move axially by a predetermined amount.
The sealing member and the spring member are both substantially annular, and wherein the sealing member includes a lap joint at which a first end and a second end of the sealing member are joined.
The lap joint has a thickness which is substantially the same as a thickness of the remainder of the sealing member.
The sealing member and the spring member are both annular, and wherein the supporting edge of the sealing member is located radially outwardly of the movable edge.
The spring member is under tension.
The spring member is adapted to bias the movable edge of the sealing member inwardly against the sealing surface, with the sealing surface being substantially cylindrical.
A minimum inner diameter of the annular sealing member, with the electrode removed from the furnace, is less than a diameter of the electrode.
The fixed surface is located on the furnace roof, and wherein the supporting edge of the annular sealing member is secured to the fixed surface.
The fixed surface comprises an annular seal housing on the roof of the furnace, and wherein the supporting edge of the sealing member is secured to the seal housing.
The supporting edge of the sealing member is secured beneath a retaining plate of the seal housing.
The seal housing has an open top.
The electrode seal assembly further comprising an annular brick housing shield provided between the annular seal housing and the roof of the furnace.
The brick housing shield comprises an annular ring of refractory brick surrounding the port and partly covering the annular gap between the electrode and the port.
The electrode seal assembly further comprising a copper cooler provided between the brick housing shield and the roof of the furnace.
The movable edge of the sealing member comprises a layer of flexible metal fibers or mesh.

The present invention may also provide a seal assembly for sealing an opening between a variable sealing surface and a fixed surface for use at temperatures not typically suitable for elastic materials, comprising:
(a) a sealing member having a supporting edge arranged to be secured to the fixed surface and a movable edge arranged to engage the sealing surface, the sealing member being flexible and allowing displacement of the movable edge parallel to and perpendicular to the sealing surface; and
(b) a spring member located proximate to the movable edge of the sealing member, the spring member biasing the movable edge of the sealing member away from the supporting edge.

The following may be employed in the present invention:
The sealing member comprises a material which is resistant to temperatures up to about 1500° C.
The sealing member comprises heat resistant fibers.
The heat-resistant fibers are comprised of ceramic or a heat-resistant metal, and are substantially inelastic.
The sealing member comprises at least one flexible folded sheet having a pair of opposed edges, wherein the opposed edges of the sheet are located proximate to the supporting edge of the sealing member.
The spring member is enclosed within the at least one flexible folded sheet.

The sealing member comprises a plurality of said flexible folded sheets, arranged in a plurality of layers.

The sealing member comprises a toroidal sleeve enclosing the spring member.

The toroidal sleeve has a pear-shaped radial cross-section, with the moveable edge of the sealing member having a rounded profile.

The toroidal sleeve comprises a woven arrangement of fibers.

The woven arrangement of fibers approximates a doubly-ruled surface.

With the supporting edge secured to the fixed surface, the movable edge is free to move axially by a predetermined amount.

The sealing member and the spring member are both substantially annular, and wherein the sealing member includes a lap joint at which a first end and a second end of the sealing member are joined.

The lap joint has a thickness which is substantially the same as a thickness of the remainder of the sealing member.

The sealing member and the spring member are both annular, and wherein the supporting edge of the sealing member is located radially outwardly of the movable edge.

The spring member is under tension.

The spring member is adapted to bias the movable edge of the sealing member inwardly against the sealing surface, with the sealing surface being substantially cylindrical.

The sealing member and the spring member are both annular, and wherein the supporting edge of the sealing member is located radially inwardly of the movable edge.

The spring member is under compression.

The spring member is adapted to bias the movable edge of the sealing member outwardly against the sealing surface, with the sealing surface being substantially cylindrical.

The present invention may also provide an annular sealing member comprising a supporting edge arranged to be secured to a surface, and a movable edge arranged to engage an outer substantially cylindrical surface, the sealing member comprising at least one flexible sheet comprised of a woven arrangement of heat-resistant fibers, the at least one flexible sheet being foldable so as to form a toroidal sleeve.

The following may be employed in the present invention:

The at least one flexible sheet approximates a doubly-ruled surface.

The sealing member comprises a plurality of said flexible sheets, arranged in a plurality of layers.

The heat-resistant fibers are comprised of a heat-resistant metal or ceramic.

Although the above subject matter has been described in connection with certain specific embodiments, it is not intended to be limited thereto. Rather, the subject matter described herein includes all embodiments which may fall within the scope of the claims that follow.

LIST OF REFERENCE NUMBERS

10 Seal Assembly
12 Furnace Roof
14 Electrode Port
16 Electrode
18 Electrode Outer Surface
20 Annular Gap
22 Sealing Member
24 Secured Edge of Sealing Member
26 Movable Edge of Sealing Member
28 Spring Member
30 Seal Housing
32 Sheet making up the Sealing Member
34 Upper Secured Edge of Sheets
36 Lower Secured Edge of Sheets
38 Sealing Member Hollow
40 Fiber
44 Brick Housing Shield
46 Vertical Side Wall of Housing
48 Horizontal Top Flange of Housing
50 Horizontal Bottom Flange of Housing
52 Retaining Plate of Housing
54 Housing Pins
56 Apertures of Seal Member
58 Metal grommets of Seal Member
66 Refractory Bricks
68 First end of Sealing Member
70 Second End of Sealing Member

What is claimed is:

1. A seal assembly for sealing a substantially annular opening between a cylindrical surface and a fixed surface for use at temperatures not typically suitable for elastic materials, comprising:

(a) a sealing member having a secured edge arranged to be secured to the fixed surface and a movable edge arranged to engage the cylindrical surface, the sealing member being flexible and allowing displacement of the moveable edge parallel to and perpendicular to a vertical axis of the cylindrical surface; and (b) a spring member located inside the movable edge of the sealing member, the spring member arranged to be in tension tangent to the cylindrical surface and force the moveable edge of the sealing member away from the secured edge and into sealing engagement with the cylindrical surface.

2. The seal assembly according to claim 1, wherein the sealing member comprises a material which is resistant to temperatures up to about 1500° C.

3. The seal assembly according to claim 1, wherein the sealing member comprises substantially inelastic, heat-resistant fibers comprised of ceramic or a heat-resistant metal.

4. The seal assembly according to claim 1, wherein the sealing member comprises at least one flexible folding sheet having a pair of opposed edges, wherein the opposed edges of the sheet are located proximate to the secured edge of the sealing member.

5. The electrode seal assembly according to claim 4, wherein the sealing member further comprises an additional outer sheet comprising a layer of flexible metal fibers or metal mesh.

6. The seal assembly according to claim 4, wherein the spring member is enclosed within the at least one flexible folded sheet.

7. The seal assembly according to claim 4, wherein the sealing member comprises a plurality of said flexible folded sheets, arranged in a plurality of layers.

8. The seal assembly according to claim 7, wherein the sealing member has a toroidal shape and comprises a toroidal collar made up of said flexible folded sheets, and enclosing the spring member.

9. The seal assembly according to claim 8, wherein the toroidal collar has a pear-shaped radial cross-section, with the moveable edge of the sealing member having a rounded profile.

10. The seal assembly according to claim 8, wherein the toroidal collar comprises a woven arrangement of fibers.

11. The seal assembly according to claim 10, wherein the woven arrangement of fibers approximates a double-ruled surface.

12. The seal assembly according to claim 1, wherein, with the secured edge of the sealing member secured to the fixed horizontal surface, the moveable edge is free to move axially along the vertical axis by a predetermined amount to significantly reduce relative movement between the cylindrical surface and the movable edge of the sealing member.

13. The seal assembly according to claim 1, wherein the sealing member and the spring member are both substantially annular, and wherein the sealing member includes a lap joint at which a first end and a second end of the sealing member are joined;

wherein the lap joint has a thickness which is substantially the same as a thickness of the remainder of the sealing member.

14. The seal assembly according to claim 1, wherein the sealing member and the spring member are both substantially annular, and wherein the secured edge of the sealing member is located radially outwardly of the moveable edge.

15. The seal assembly according to claim 14, comprising an electrode seal assembly, wherein:

the cylindrical surface comprises an outer cylindrical surface of an electrode;

the fixed surface comprises an edge of a port in a furnace roof of an electric furnace, wherein a lower end of the electrode extends through the port into the furnace, and the electrode is movable through said port along the vertical axis;

the opening between the cylindrical surface and the fixed surface comprises an annular gap between an outer cylindrical surface of the electrode and the edge of the port in the furnace roof; and the moveable edge of the seal assembly being displaceable axially and radially relative to said vertical axis, permitting continuous engagement with the outer cylindrical surface of the electrode.

16. The seal assembly according to claim 15, wherein a minimum inner diameter of the annular sealing member, with the electrode removed from the seal assembly, is less than a diameter of the electrode.

17. The electrode seal assembly according to claim 15, wherein the fixed surface comprises an annular seal housing on the furnace roof, and wherein the secured edge of the sealing member is secured to the seal housing.

18. The electrode seal assembly according to claim 17, wherein the secured edge of the sealing member is secured beneath a retaining plate of the seal housing.

19. The electrode seal assembly according to claim 17, wherein the seal housing has an open top.

20. The electrode seal assembly according to claim 17, further comprising an annular brick housing shield provided between the annular seal housing and the furnace roof.

21. The electrode seal assembly according to claim 20, wherein the brick housing shield comprises an annular ring of refractory brick surrounding the port and partly covering the annular gap between the electrode and the port.

22. The electrode seal assembly according to claim 20, further comprising a copper cooler provided between the brick housing shield and the furnace roof.

23. A seal assembly for sealing a substantially annular opening between a cylindrical surface and a fixed surface for use at temperatures not typically suitable for elastic materials, comprising:

(a) a sealing member having a secured edge arranged to be secured to the fixed surface and a movable edge arranged to engage the cylindrical surface, the sealing member being flexible and allowing displacement of the movable edge parallel to and perpendicular to a vertical axis of the cylindrical surface; and (b) a spring member located inside the movable edge of the sealing member, the spring member arranged to be in compression tangent to the cylindrical surface such that it applies a force only to the movable edge of the sealing member, forcing the movable edge away from the secured edge and into sealing engagement with the cylindrical surface;

wherein the secured edge of the sealing member is located radially inwardly of the movable edge, and wherein the spring member is under compression.

* * * * *